United States Patent [19]
Reynolds

[11] Patent Number: 5,938,900
[45] Date of Patent: Aug. 17, 1999

[54] METHOD AND APPARATUS FOR TREATING WATER

[76] Inventor: Sam C. Reynolds, 3150 Flintwood Dr., Columbus, Ind. 47203

[21] Appl. No.: 08/988,108

[22] Filed: Dec. 10, 1997

[51] Int. Cl.$^6$ .................................................. C02F 1/461
[52] U.S. Cl. ...................................... 204/275; 204/DIG. 5
[58] Field of Search ............................. 204/DIG. 5, 275; 210/222

[56] References Cited

U.S. PATENT DOCUMENTS

| | | | |
|---|---|---|---|
| 4,299,700 | 11/1981 | Sanderson | 210/222 |
| 5,059,296 | 10/1991 | Sherman | 204/DIG. 5 |
| 5,114,571 | 5/1992 | Pier et al. | 204/DIG. 5 X |

*Primary Examiner*—Arun S. Phasge
*Attorney, Agent, or Firm*—Chase & Yakimo, L.C.

[57] ABSTRACT

A method and apparatus for purifying and treating water includes a first magnetic plug having a plurality of polarizing magnets evenly spaced about the circumference of a circular aperture. The longitudinal axis of each magnet is perpendicular to the aperture with its north pole magnetic field directed radially outwardly and its south pole directed radially inwardly to provide a magnetic charge to water molecules passed through the magnetic plug. The water stream is further passed through a chamber having two electrodes made of a copper/silver alloy. By alternating the polarity between the electrodes, copper and silver ions are released into the water while avoiding fouling of either electrode. The water stream is then passed through a filter assembly and a second magnetic plug to enhance retention of beneficial minerals and ions. The configuration of the apparatus and housing first decreases the fluid flow rate to prolong contact of the fluid flow with the ionization process and filter assembly and then increases the fluid flow rate prior to discharge from the apparatus. The configuration assures that the fluid flow rate is not noticeably diminished upon its insertion into a water line.

14 Claims, 12 Drawing Sheets

METHOD AND APPARATUS FOR TREATING WATER

BACKGROUND OF THE INVENTION

This invention relates to the field of water purification and, more particularly, a method and apparatus for purifying and treating water by passing a water stream through a polarizing magnetic field and introducing mineral ions into the stream.

It has become well-known that untreated tap water can cause a variety of problems to a homeowner's water pipes as well as to the health of the occupants themselves. Although water initially treated at city water facilities is generally potable, the level of purity desired by an increasing number of consumers is often not achieved. Undesirable levels of algae and/or bacteria are still present in singly treated tap water. An additional problem faced by homeowners is the scaling that occurs within water pipes when mineral deposits precipitate out of a water stream.

Various methods and devices have been proposed in the prior art to purify water or reduce the problem of scaling. In U.S. Pat. No. 5,057,198 to Bochkarev, an electrochemical treatment is proposed which preliminarily softens water by first passing water through a cathode chamber to produce a catholyte from which precipitating hardness salts are separated. The stream is then passed through an anode chamber to produce a final anolyte product. U.S. Pat. No. 4,605,498 to Kulish teaches that exposing a liquid to a predominately south pole oriented magnetic field also promotes descaling. Another water treatment method involves adding chemicals such as lime to the water to facilitate filtration of hardness salts. Yet another method involves passing the water stream through a tank of sodium-filled beads which absorb hard minerals, replacing the minerals with high levels of sodium. Purification methods suitable for swimming pools are also known which pass water over electrodes which release copper and silver ions into the water to cooperatively destroy algae and bacteria.

Although assumably effective to either reduce scaling or purify water, such known devices fail to provide a simple, efficient, and economical option for complete home water treatment. Devices which require chemicals for their function suffer from the inconvenience of continuous maintenance and the expense of replenishment. Also, water softening techniques, while assumably promoting descaling, have the effect of removing minerals from the water that are essential to good health. A need still exists for a water treatment system suitable for inline home use that purifies water without the addition of chemicals while simultaneously promoting descaling without removing beneficial minerals.

SUMMARY OF THE INVENTION

In response thereto I have invented a method and apparatus for the treatment of water which utilizes a plurality of polarizing magnets in a hollow magnetic plug attached to an inlet water pipe. The magnets are evenly spaced about the circumference of an aperture in the plug so as to provide a magnetic charge to water molecules passing through the magnetically surrounded pipe. Magnetization gives the water molecules an ionic charge that is greater than the ionic charge of the mineral molecules dissolved therein, thus creating a natural magnetic attraction between the water molecules and minerals therein. The magnetic charge imparted to the water stream preserves essential minerals in the water and prevents the minerals from crystallizing into hard rock scale within the water pipe.

Following magnetization, the water stream enters a housing having two copper/silver electrodes. A small electrical voltage is alternatively passed between the two electrodes at a rate determined by a computerized control panel, causing copper and silver ions to be deposited into the water. Before exiting the housing, the water stream is passed through a filter to collect any impurities created during ionization and then through another polarizing magnetic plug to enhance retention of the copper and silver ions.

It is desirable to introduce copper and silver ions into a water stream prior to human consumption. Copper ions are an effective killer of all species of algae and are presently used to control algae in lakes and reservoirs. Similarly, silver ions have unique antimicrobial properties that destroy bacteria and viruses. Accordingly, silver nitrate is commonly used in medicines to prevent infection. The United States Environmental Protection Agency has determined that copper and silver ion levels far in excess of levels contemplated for home water treatment are safe for human consumption.

It is therefore a general object of this invention to provide a method and apparatus for water treatment which magnetically polarizes water molecules to prevent beneficial minerals dissolved in water from crystallizing into hard rock scale within a water pipe.

Another object of this invention is to provide a method and apparatus, as aforesaid, which ionizes a water stream with copper and silver ions to destroy algae, bacteria, and viruses contained therein by electrically stimulating copper/silver alloy electrodes.

Still another object of this invention is to provide a method and apparatus, as aforesaid, which magnetically polarizes water molecules both before and after ionization to more effectively purify the water and enhance mineral retention.

A further object of this invention is to provide a method and apparatus, as aforesaid, which allows a user to adjust the rate at which copper and silver ions are released into the water stream.

Yet another object of this invention is to provide a method and apparatus, as aforesaid, which is suitable for inline use such as under a sink or, alternatively, in connection with a hot water tank to service an entire house or building.

Still another object of this invention is to provide a method and apparatus, as aforesaid, which does not require the addition of chemicals or require significant maintenance.

A further object of this invention is to provide a method and apparatus, as aforesaid, which is simple and inexpensive in construction and thus suitable for household use.

A still further object of this invention is to provide a method and apparatus, as aforesaid, which provides a filter for collecting impurities which may be introduced during the magnetization or ionization processes.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
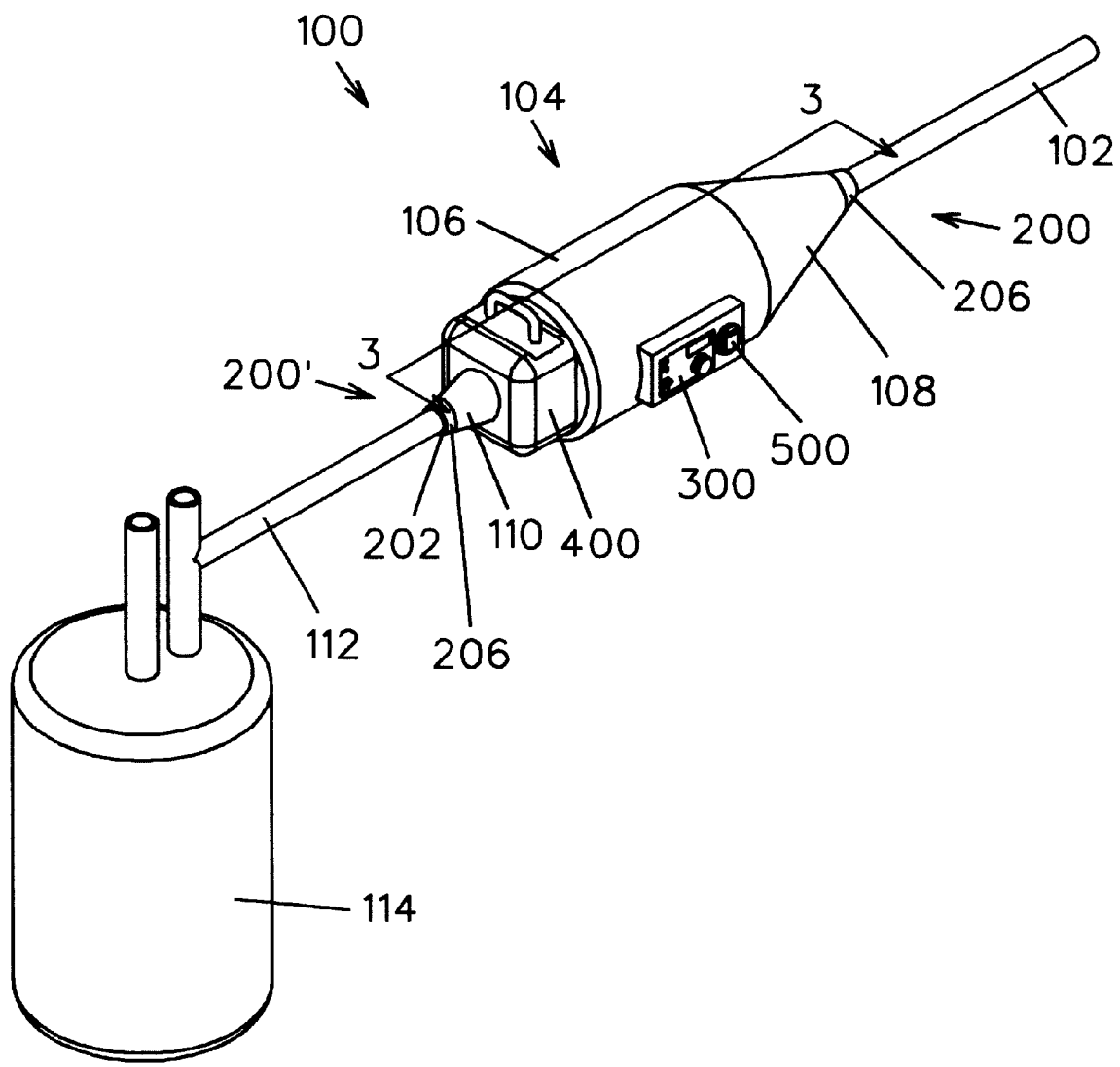
FIG. 1 is an isometric view of the water purification assembly showing the assembly connected to a hot water tank.
Figure 2:
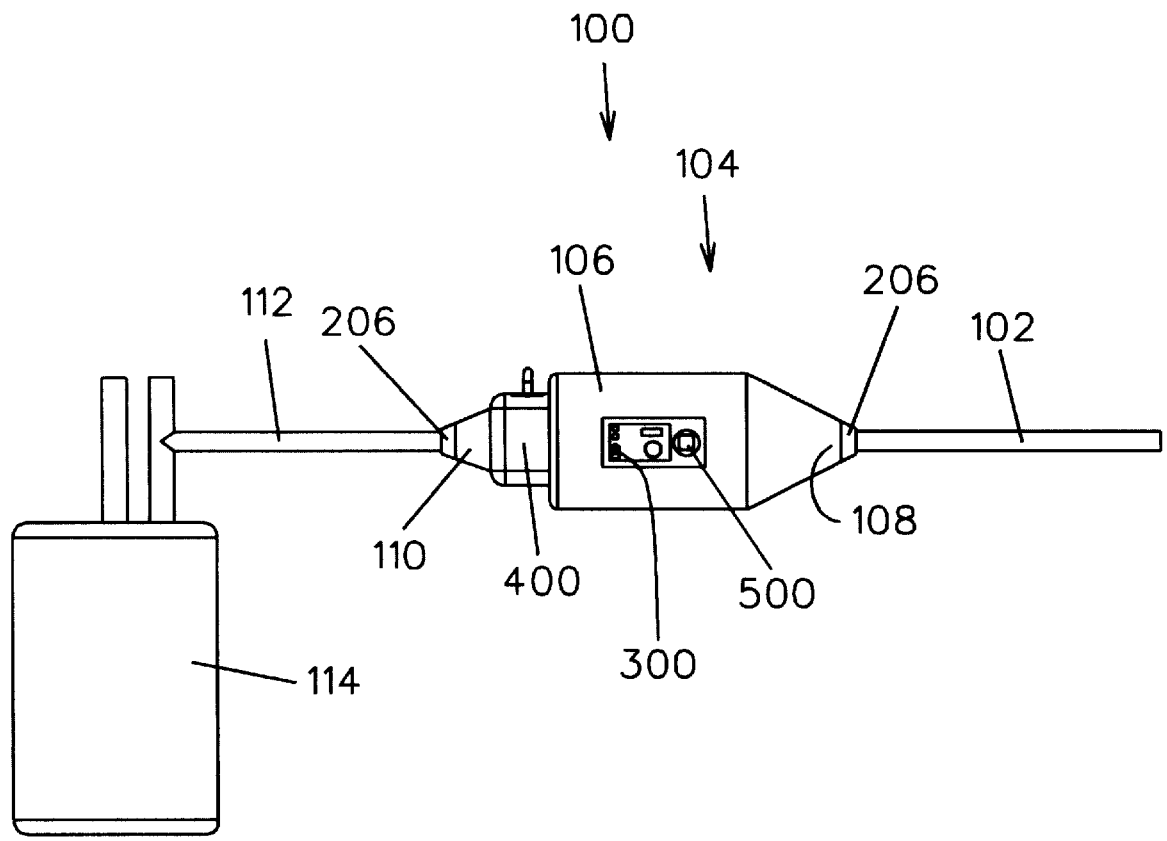
FIG. 2 is a front view of the water purification assembly shown in FIG. 1.
Figure 3:
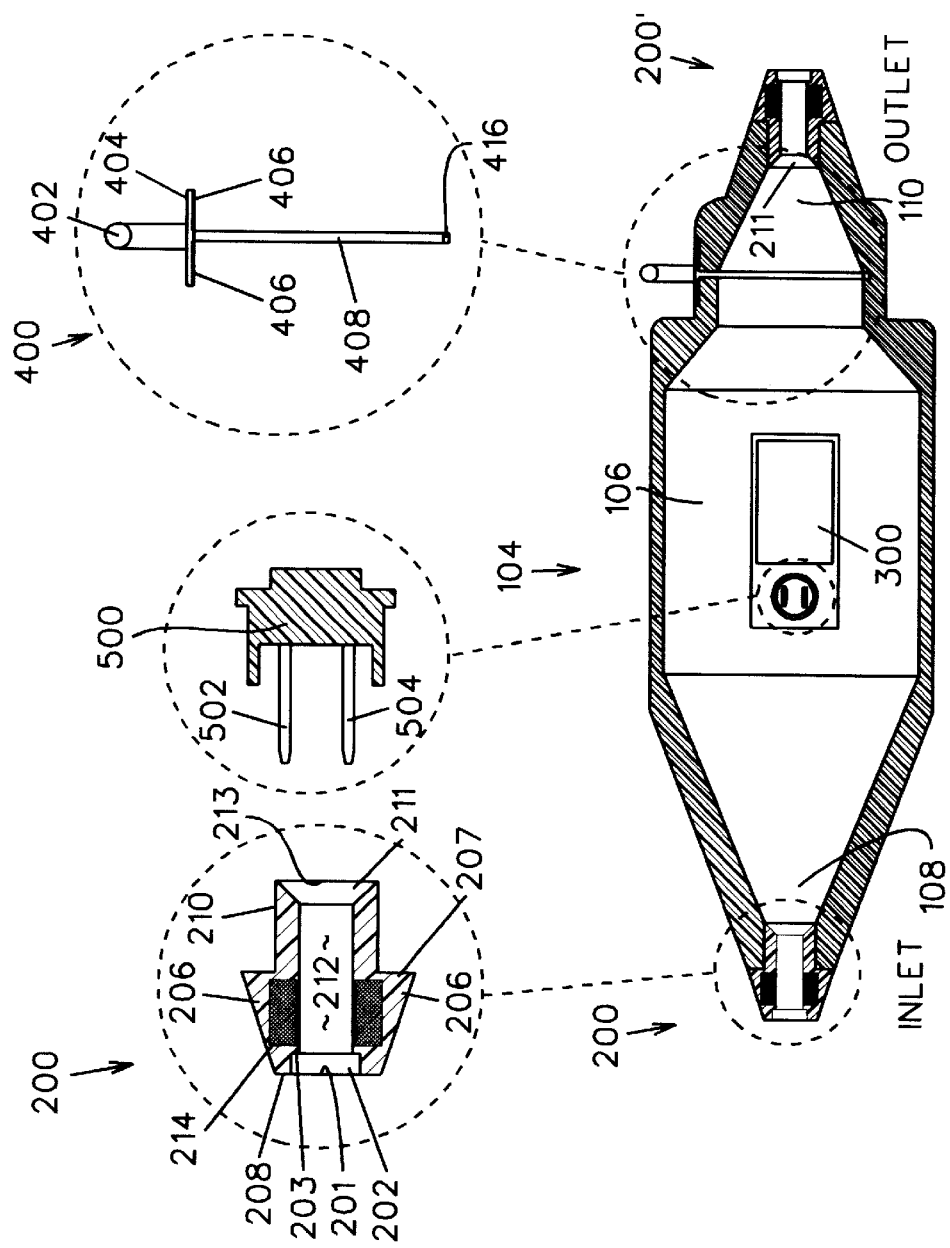
FIG. 3 is a central sectional view of the water purification assembly with enlarged magnetic plug, electrodes, and filter assembly views.

Turning more particularly to the drawings, FIGS. 1–3 show the preferred embodiment of the water treatment apparatus 100 connected to upstream 102 and downstream water pipes 112. The apparatus includes a housing 104 with chamber 106 and magnetic plugs 200, 200' at the inlet 108 and outlet 118 ends of the housing 104. A computer unit 300 for controlling an electrode assembly and a filter assembly 400 are further associated with the device 100.

Figure 12:
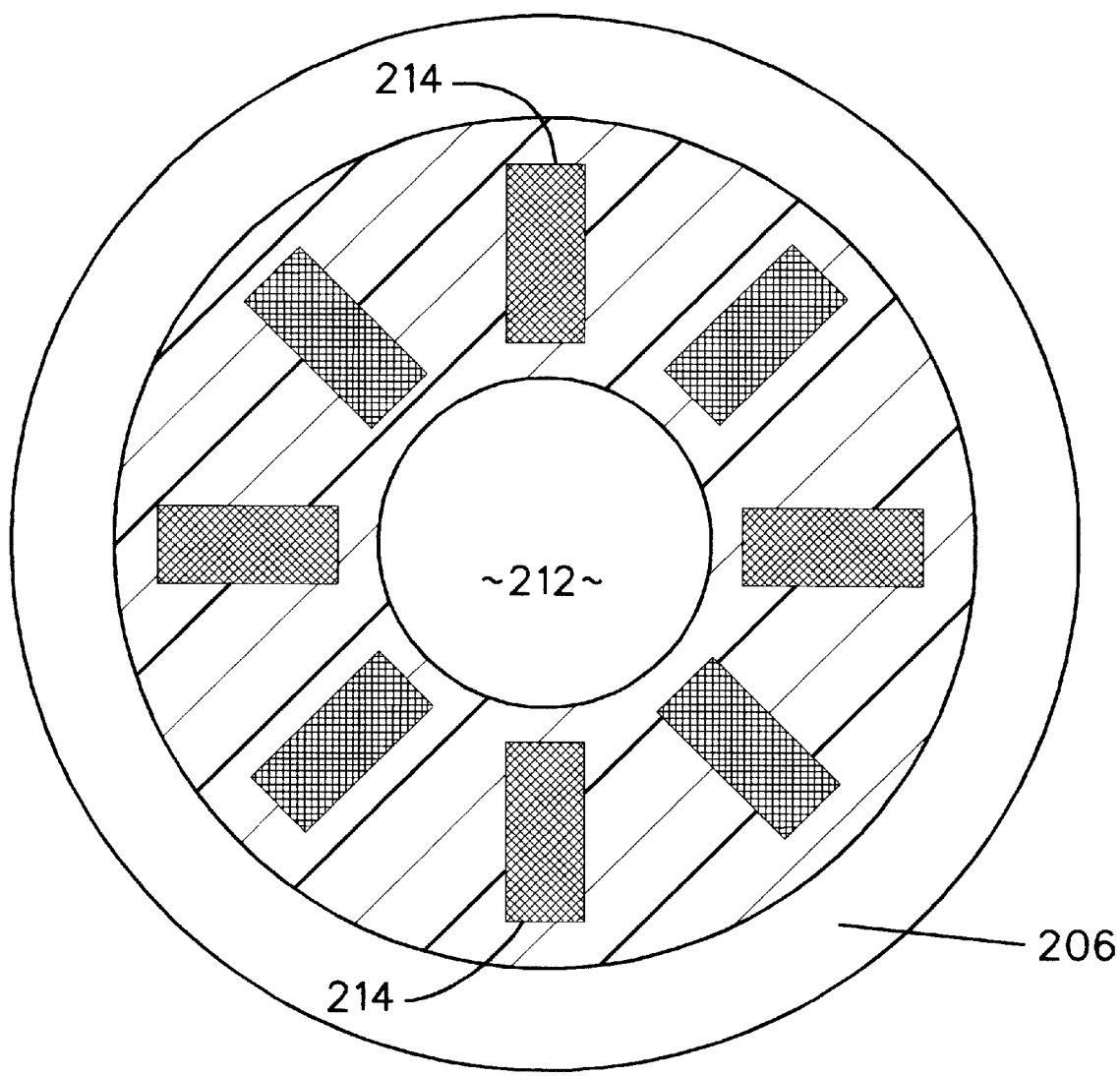
FIG. 12 is a sectional view of the magnetic plug taken along line 12—12 in FIG. 3.

A fluid flow is directed into the inlet 108 of housing 104 from a standard water pipe 102. As illustrated in FIGS. 3, 10–12, a first magnetic plug 200 comprises a generally tapered head or casing 206 presenting an exterior shoulder 207 about a cylindrical conduit 210. Conduit 210 includes bore 212 therein which extends from the shoulder 207 of the casing 206. At the interior end of plug 200 and conduit 210 is presented a tapered bore 211 which communicates with bore 212. Bore 211 increases in diameter between the end of bore 212 and conduit 210. Thus, the fluid flow velocity will either decrease or increase upon passage of fluid through bore 211 depending on the direction of fluid flow. Central bore 212 extends through plug 200 and communicates with a bore 202 of an increased diameter at the exterior end of plug 200. Bore 202 cooperates with end 208 of casing 206 to present a sleeve for insertion of an end of the water pipe therein, the end of a water pipe abutting the shoulder 203 within sleeve 202 upon a proper seating. The casing 206, adjacent the juncture of bores 202, 212, includes a plurality of bar magnets 214 evenly spaced about the circumference of the circular bore 212, the longitudinal axis of each magnet 214 intersecting with the center point of bore 212 (FIG. 12). Each magnet 214 thus radially extends from the center of bore 212 with the south poles being adjacent thereto. In function, water molecules passing through the bores 202, 212, are charged by the magnetic fields formed by the south poles of the bar magnets 214. The charged particles in the fluid flow through plug 200 preclude crust/scale buildup about the bore 212 and end of water pipe seated within the adjacent bore 202.

The first magnetic plug 200 is inserted within an aperture at inlet end 108 of the housing 104, said inlet end aperture having a diameter slightly greater than the diameter of the magnetic plug conduit 210. The exterior shoulder 207 of plug 200 abuts the free edge of inlet end 108 when plug 200 is properly seated and thus closes the aperture thereto. Water from pipe 102 flows into bore 212, through the magnetic field formed therein and then through the increasing diameter of bore 211 and into chamber 106. This configuration cooperates with the configuration of the interior of inlet 108 to reduce the velocity of water flowing into chamber 106 from bore 212 which prolongs the interaction of water with the below discussed electrodes 502, 504 in chamber 106.

Figure 7:
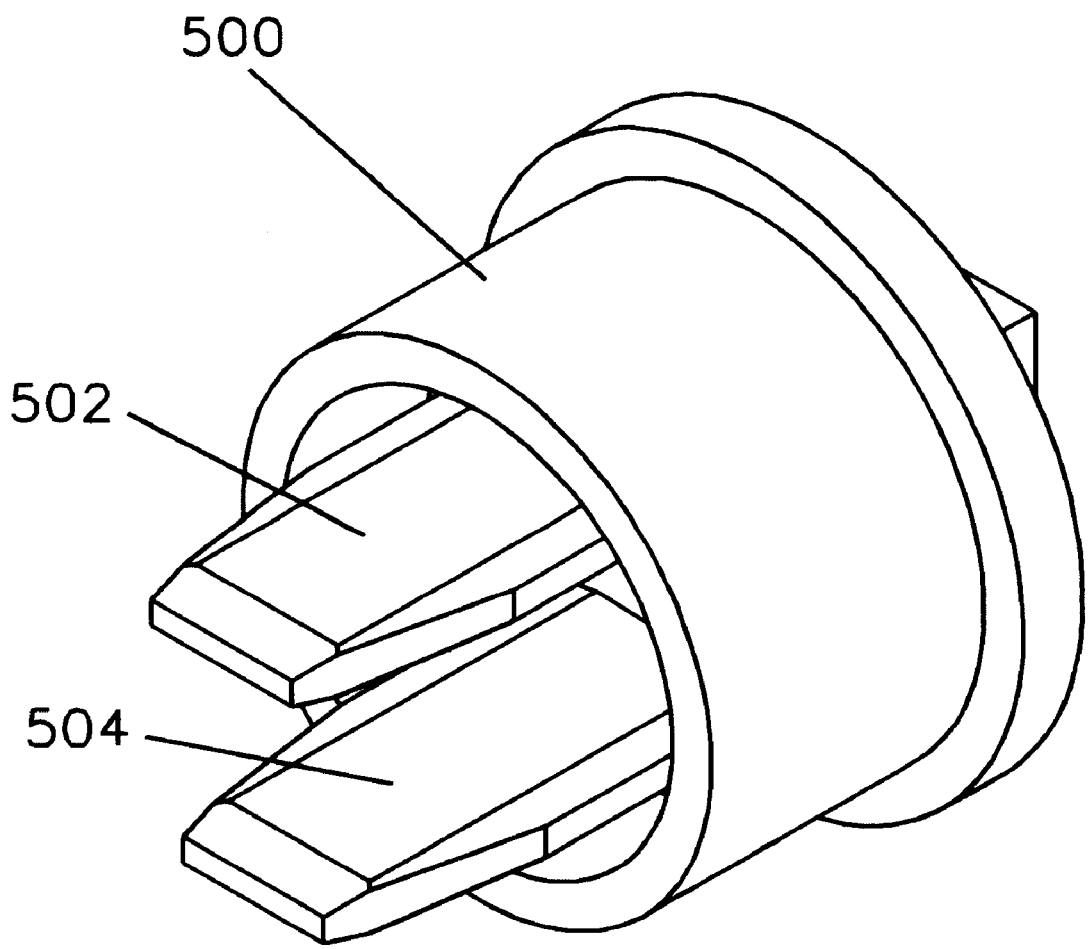
FIG. 7 is an isometric view of the cell containing copper/silver alloy electrodes.
Figure 8:
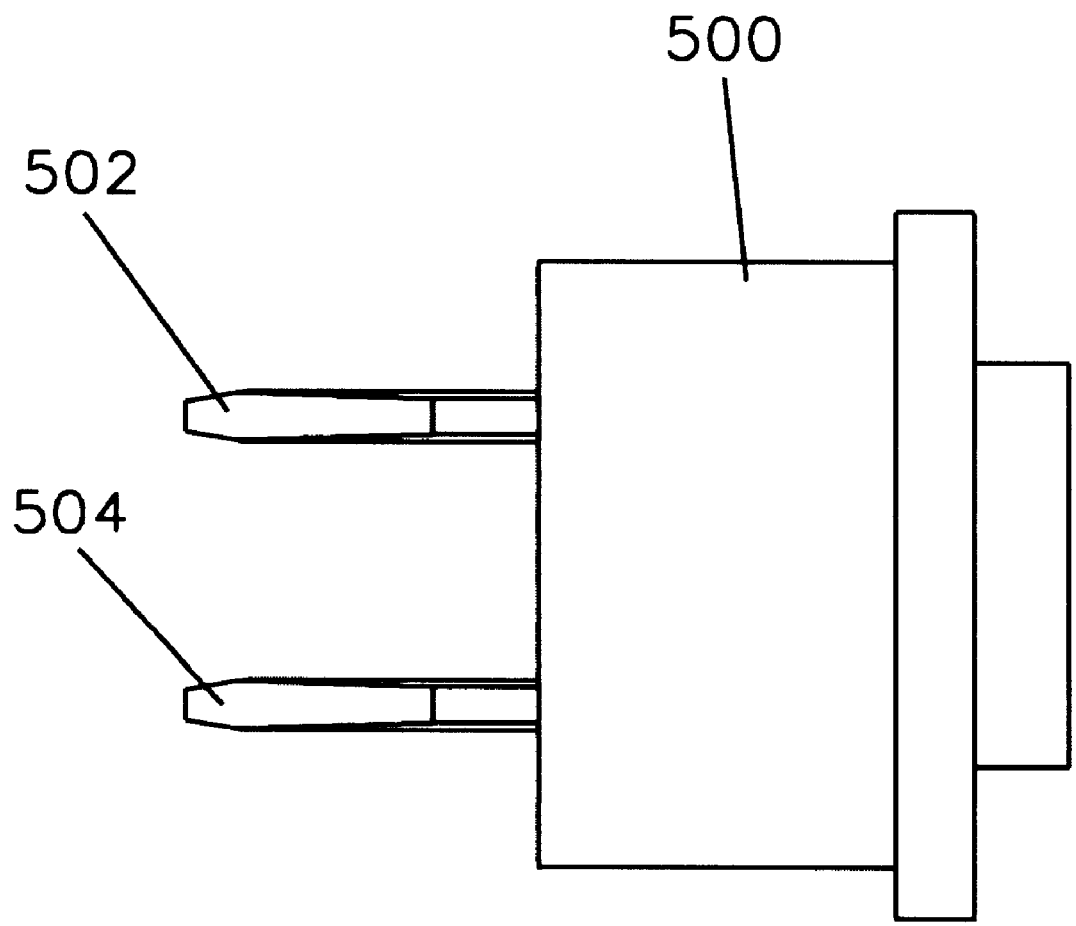
FIG. 8 is a right side view of the electrode cell shown in FIG. 7.
Figure 9:
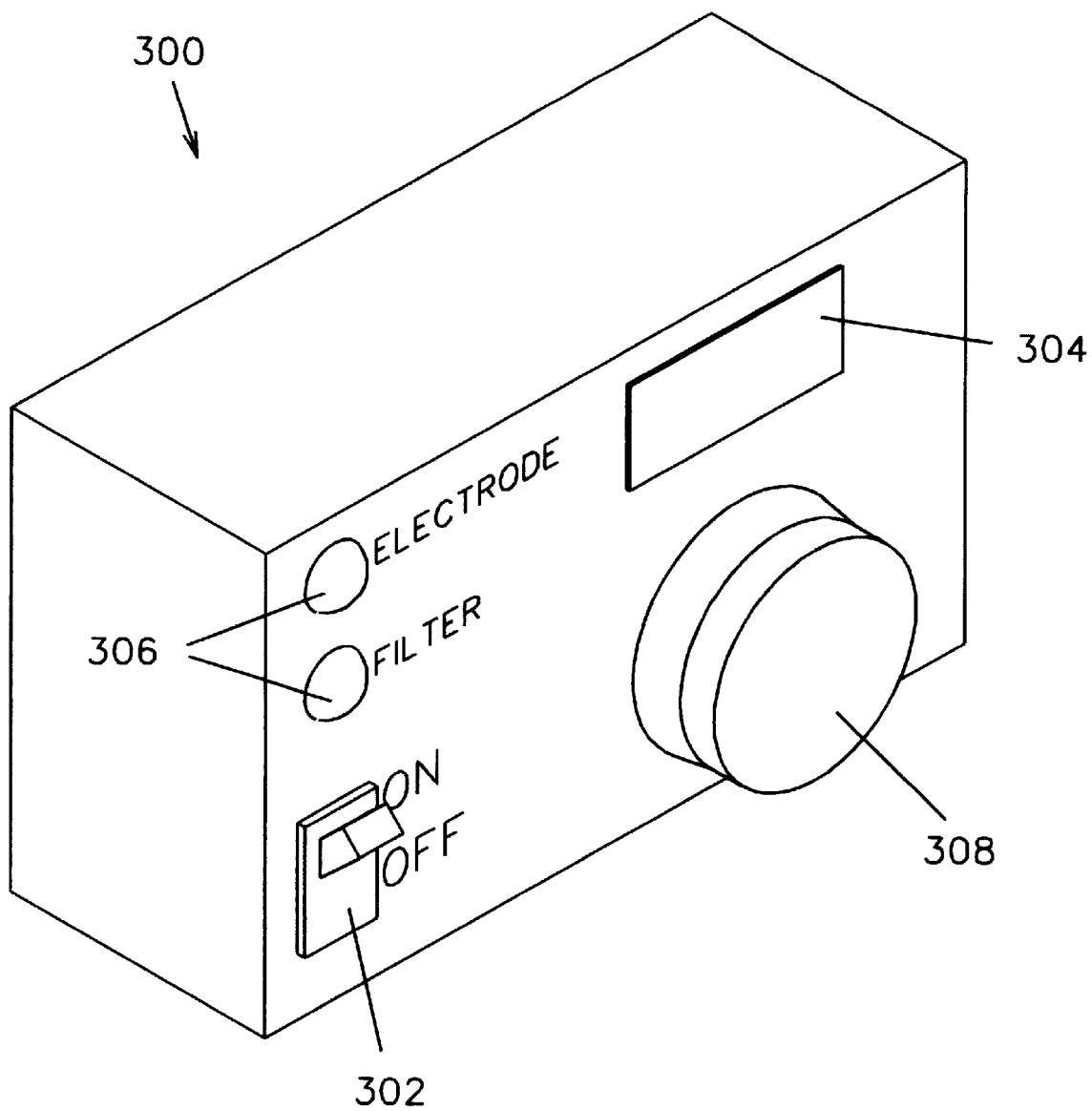
FIG. 9 is an isometric view of the water purification assembly control unit.
Figure 10:
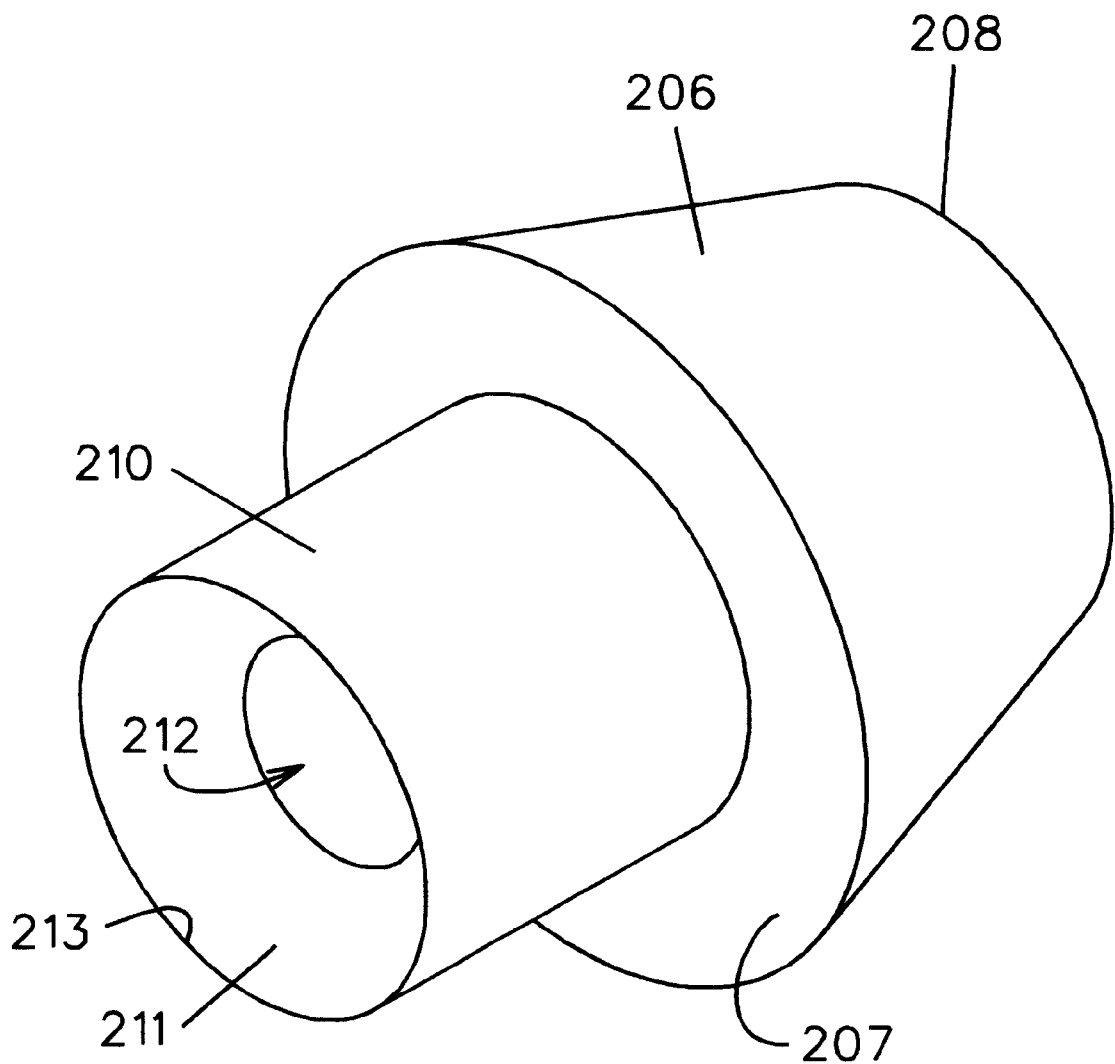
FIG. 10 is an isometric view of a magnetic plug from the interior end thereof.
Figure 11:
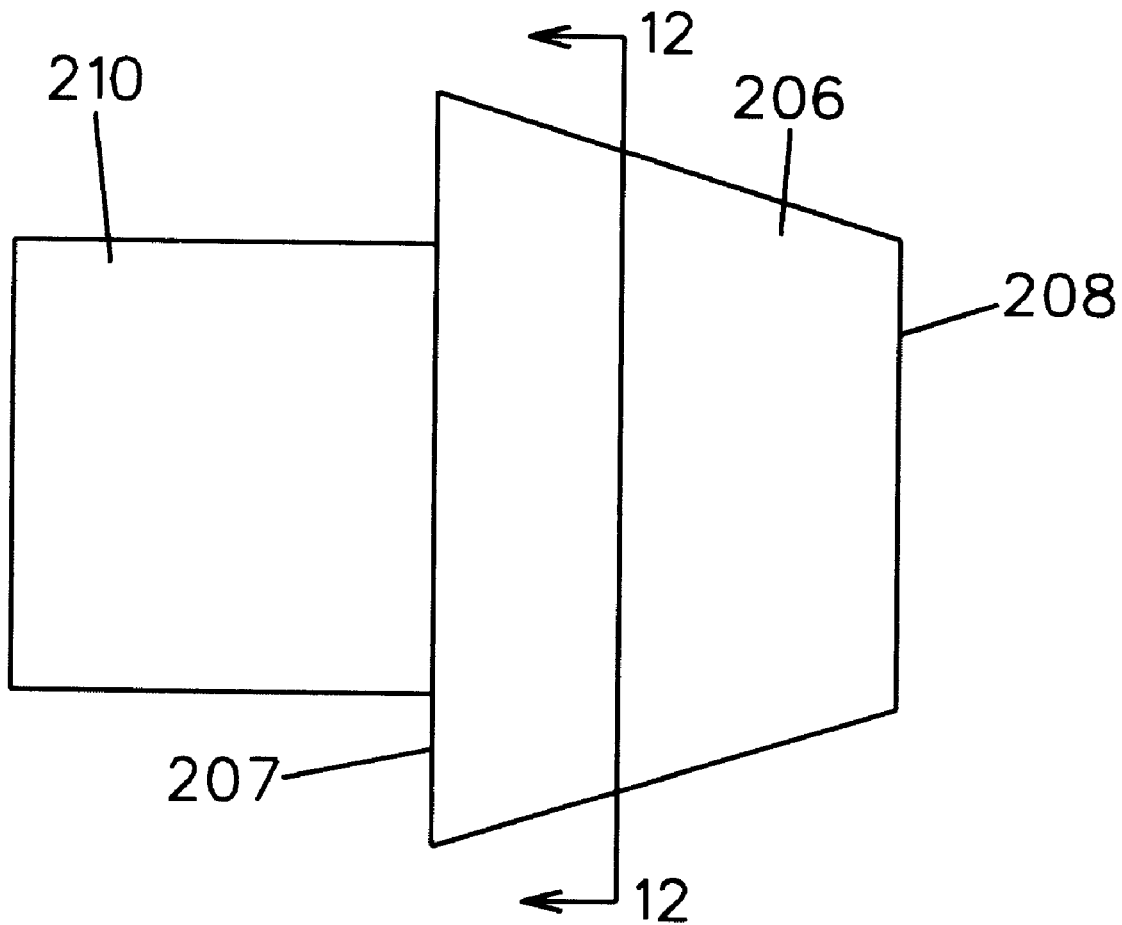
FIG. 11 is a side view of the magnetic plug shown in FIG. 10.

The chamber 106 includes a computerized control panel 300 and a cell assembly 500 having first and second electrodes 502, 504 (FIGS. 7–8) preferably made of a copper/silver alloy. As shown in FIG. 9, the control panel 300 includes a power switch 302, digital display 304, status lights 306, and a user control knob 308 for adjusting the rate of ionization. Upon delivery of current to the electrodes 502, 504, copper and silver ions are released into the water at a rate proportional to the delivered current. This water ionization process results in depletion of ions from one electrode and accumulation of the released ions by the other electrode. By alternating electrode polarity, a buildup of scale on the electrodes is avoided. The use of copper ions as an algicide and silver ions as a bactericide as well as methods for alternatively releasing such ions from the electrodes to a liquid is known.

Figure 4:
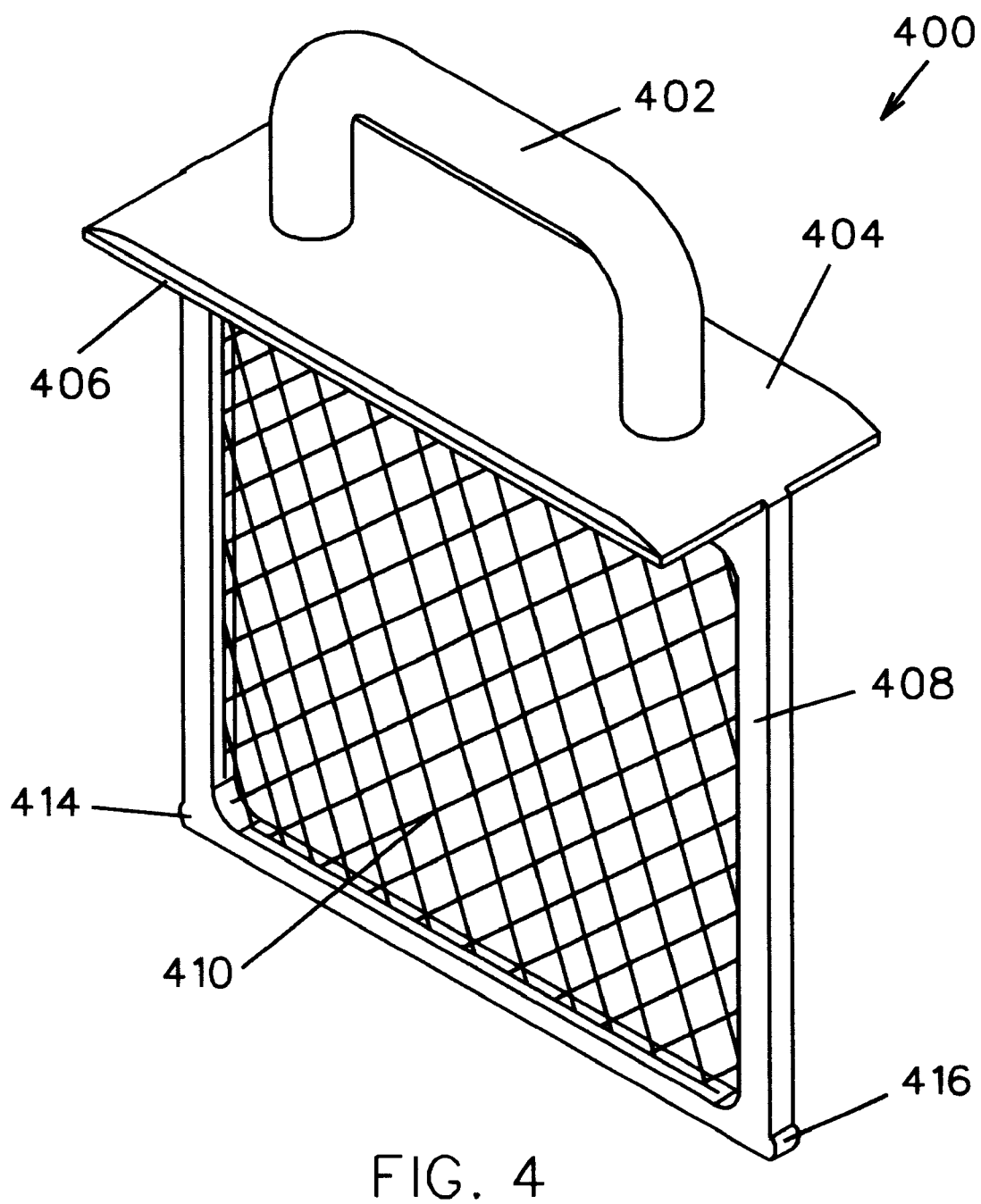
FIG. 4 is an isometric view of the filter assembly.
Figure 5:
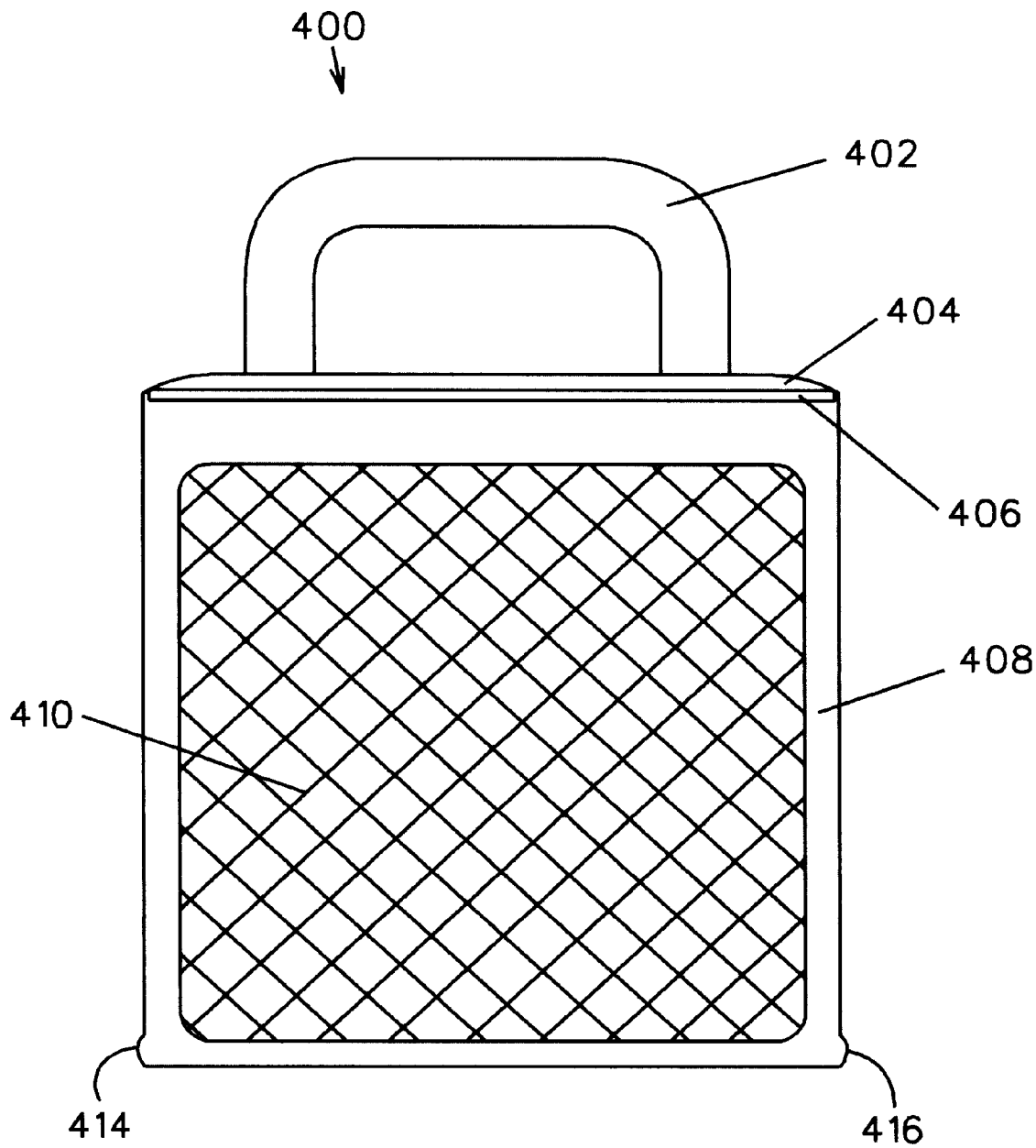
FIG. 5 is a front view of the filter assembly shown in FIG. 4.
Figure 6:
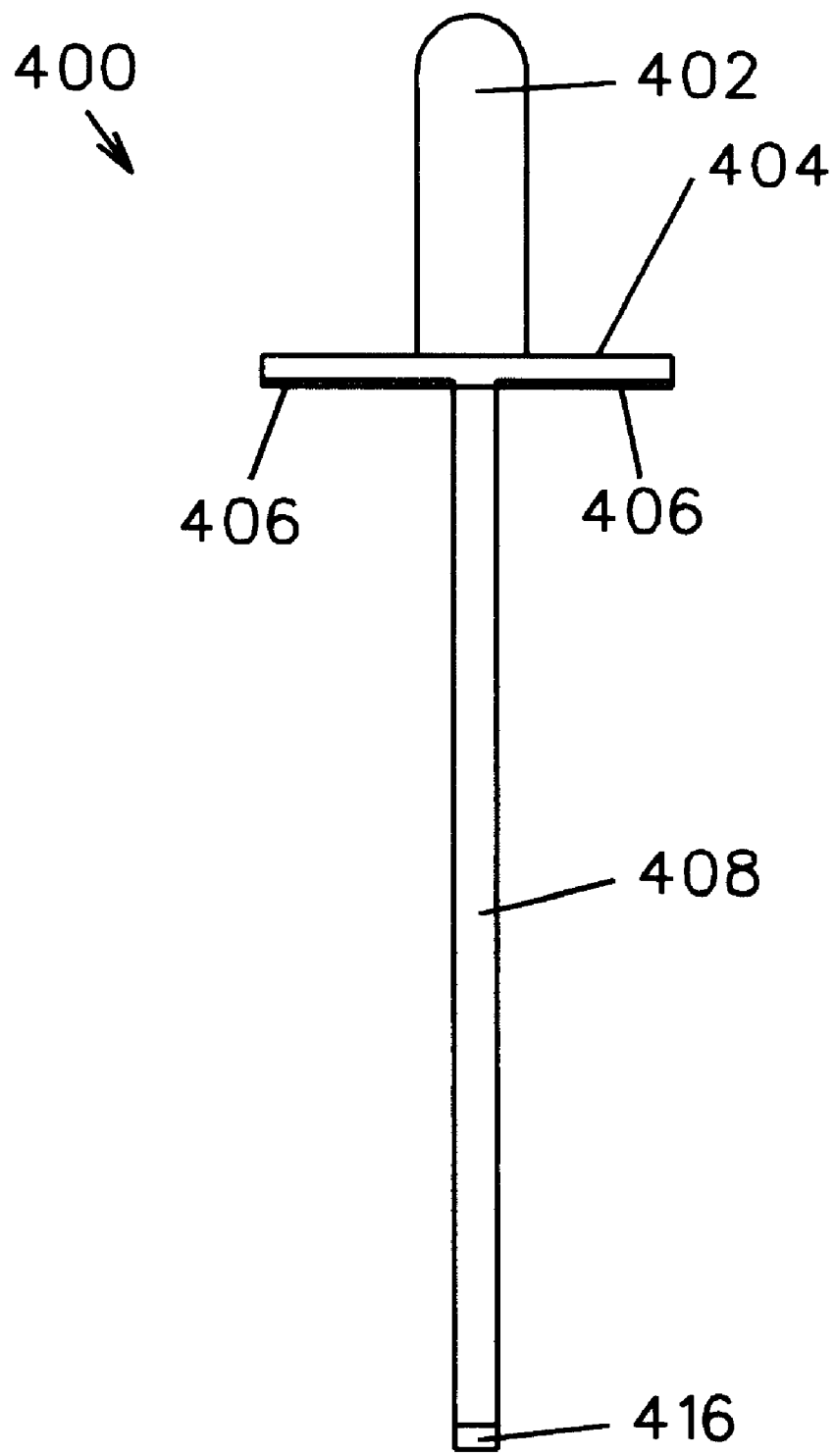
FIG. 6 is a right side view of the filter assembly shown in FIG. 4.

The magnetized/ionized water stream flows through the chamber 106 to engage a filter assembly 400 downstream of chamber 106. As seen in FIGS. 4–6, the filter assembly includes a handle 402 integrally attached to a filter cover 404 for easy removal, cleaning, or replacement. A rubber seal 406 is fixedly attached to the underside of the cover 404. The filter assembly 400 further includes a frame 408 having generally rectangular dimensions integrally attached to the filter cover 404, said frame surrounding a filter 410 for collecting any waste products created by the ionization process. The filter frame 408 includes a base 412 having oppositely disposed outwardly arcuate appendages 414, 416 for snappably securing the filter assembly 400 to the housing 104. A slot (not shown) in the outlet end 100 of housing 104 receives the frame 408 therein so that the filter spans the interior of the housing 104. Rubber seal 404 meshes with the slot to preclude water leakage from the housing 104.

The housing 104 conically decreases in diameter at an outlet end 110 which increases the velocity of the fluid flow. The treated water stream passes from the outlet end 110 through bore 211 of a second magnetic plug 200' which closes the outlet aperture of housing 104. Plug 200' has an identical configuration as described above in relation to first magnetic plug 200. As such, the velocity of fluid flow increases upon flow through bore 211 for flow through bore 212 and into downstream water pipe 112 seated in bore 202. Magnets 214 as above described are located at the juncture of bores 212, 202 so as to treat the water flow and diminish the probability of deposit buildup thereat as above described. This treatment enhances retention of essential mineral deposits in the fluid flow as well as the copper and silver ions introduced therein by the upstream ionization process. The downstream water pipe 112 may be connected to a hot water tank 114.

As best shown in FIG. 3, the interior of the inlet and outlet ends of housing 104 are configured such that the fluid flow therein is first decreased at inlet end 108 so as to slow the rate of fluid flow delivered to chamber 106 which prolongs interaction with the ionization process. Subsequently, the rate of fluid flow at the downstream outlet 110 increases so as to approach its inlet flow rate. Thus, the insertion of the apparatus 100 into a water line should not noticeably decrease the flow rate of the treated water delivered to downstream pipe 112.

It is also understood that while the preferred embodiment illustrated in FIGS. 1 and 2 shows the water treatment apparatus attached to the inlet side of a hot water tank 114, the apparatus may easily be attached inline at any point in a residential water system. The combination of magnetization, ionization and filtering assures that a properly treated fluid flow is delivered downstream.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A fluid treatment apparatus comprising:
   a housing comprising an inlet end, an outlet end, and a chamber intermediate said inlet and outlet ends, said inlet end adapted for connection to an upstream fluid pipe with said outlet end adapted for connection to a downstream fluid pipe;
   first magnetic means positioned at said inlet end for directing a magnetic field onto an incoming fluid flow through said inlet end and into said chamber, whereby to magnetically treat said incoming fluid flow;
   an electrode assembly in communication with said housing comprising:
      first and second electrodes of a copper and silver alloy extending into said housing chamber;
      means for producing an electric potential between said electrodes for releasing copper and silver ions from said electrodes into the chamber and the fluid flow therein to reduce bacteria levels of said fluid flow in said chamber;
   a filter assembly spanning said housing between said chamber and outlet end; and
   second magnetic means positioned at said outlet end for directing a magnetic field onto said fluid flowing from said chamber and through said outlet end, whereby to magnetically treat said fluid flow through said outlet end.

2. The apparatus as claimed in claim 1 wherein said first and second magnetic means comprises a series of magnets spaced about said inlet and outlet ends and forming a magnetic field for interaction with said fluid flow through said inlet and outlet ends.

3. The apparatus as claimed in claim 2 wherein each of said magnets include north and south poles, said south pole of each magnet adjacent said inlet and outlet ends.

4. The apparatus as claimed in claim 1 wherein said filter assembly comprises:
   a frame;
   a filter within said frame;
   a handle extending from said frame and exterior of said housing;
   means for releasably engaging said frame within said housing.

5. The apparatus as claimed in claim 1 wherein each of said magnetic means comprises:
   a plug adapted for insertion in each respective housing end, said respective plug comprising:
      a housing;
      a central bore extending through said plug housing and presenting a first aperture exterior of said apparatus housing and a second aperture interior of said apparatus housing upon said plug insertion, said first exterior aperture adapted to receive an end of a fluid pipe therein for communicating fluid in a fluid pipe with said central bore;
      said respective magnetic means positioned in said plug housing and about said central bore.

6. The apparatus as claimed in claim 5 wherein said plug housing includes an exterior shoulder for abutting said respective apparatus housing end upon insertion of said respective plug within said respective housing end.

7. The apparatus as claimed in claim 5 further comprising an interior shoulder within said plug housing and about said central bore, a free end of a fluid pipe abutting said interior shoulder upon an insertion of a fluid pipe end through said first aperture and into said bore.

8. The apparatus as claimed in claim 5 wherein said second aperture is downstream said first aperture upon said plug insertion in said inlet end of said apparatus housing, said second aperture having a configuration decreasing a velocity of fluid flow upon passage therethrough.

9. The apparatus as claimed in claim 5 wherein said second aperture is upstream said first aperture upon said plug insertion in said outlet end of said apparatus housing, said second aperture having a configuration increasing a velocity of fluid flow upon passage therethrough.

10. A fluid treatment apparatus comprising:
    a housing having an open inlet end presenting an aperture, an outlet end presenting an aperture, and a chamber intermediate said inlet and outlet ends, said interior of said housing at said inlet end configured to decrease a velocity of a fluid flow therethrough with said interior of said housing at said outlet end configured to increase a velocity of a fluid flow therethrough;
    a plug adapted for insertion in said aperture of each respective housing end, said respective plug comprising:
       a housing;
       a central bore in said plug housing, said central bore presenting a first aperture exterior of said apparatus housing and a second aperture interior of said apparatus housing, said first aperture adapted for receiving a fluid pipe end therein, whereby to present a flow of water from an upstream fluid pipe into said inlet end and through said chamber for discharge from said outlet end and into a downstream fluid pipe;
    first magnetic means positioned about said central bore of said plug at said inlet end for directing a magnetic field to fluid flowing through said inlet end from the upstream fluid pipe connected thereto and into said chamber, whereby to treat fluid flowing through said inlet;
    an electrode assembly in communication with said housing comprising:
       first and second electrodes of a copper and silver alloy extending into said housing chamber;
       means for releasing copper and silver ions from said electrodes into the chamber and the fluid flow therein to reduce bacteria levels of the fluid in said chamber;
    a filter assembly spanning said housing chamber; and
    second magnetic means positioned about said central bore of said plug at said outlet end for directing a magnetic field to fluid flowing through said outlet end and into a downstream fluid pipe, whereby to treat fluid flowing through said outlet.

11. The apparatus as claimed in claim 10 wherein each plug further comprises:

a conduit extending from said plug housing and presenting a free end inside said apparatus housing upon said insertion;

said central bore extending through said conduit, said bore presenting said interior aperture at said free end of said conduit, said plug housing closing said aperture at said respective end of said housing upon insertion of said conduit through said respective aperture.

12. The apparatus as claimed in claim 10 further comprising a shoulder in said plug housing and surrounding said central bore, said shoulder presenting a stop for a free end of a fluid pipe inserted into said exterior aperture.

13. The apparatus as claimed in claim 11 wherein said plug housing includes a shoulder surrounding said conduit, said shoulder abutting a free edge of said apparatus housing end upon said insertion.

14. The apparatus as claimed in claim 11 wherein said interior aperture is greater in diameter than said central bore to present a funnel-shaped configuration at an end of said conduit, said configuration increasing or decreasing a rate of fluid flow therethrough.

* * * * *